United States Patent [19]

Kompelien

[11] Patent Number: 5,768,116
[45] Date of Patent: Jun. 16, 1998

[54] BI-DIRECTIONAL DC/DC VOLTAGE CONVERTER

[75] Inventor: Arlon D. Kompelien, Crosslake, Minn.

[73] Assignee: Honeywell Inc., Minneapolis, Minn.

[21] Appl. No.: 789,729

[22] Filed: Jan. 27, 1997

[51] Int. Cl.$^6$ ................................................. H02M 3/18
[52] U.S. Cl. ............................................ 363/59; 307/110
[58] Field of Search ............................. 363/59, 60, 61, 363/62; 307/110; 320/1

[56] References Cited

U.S. PATENT DOCUMENTS

| | | | |
|---|---|---|---|
| 4,127,895 | 11/1978 | Krueger | 363/86 |
| 4,777,577 | 10/1988 | Bingham et al. | 363/60 |
| 4,802,739 | 2/1989 | Iwamoto | 363/60 X |
| 4,807,104 | 2/1989 | Floyd et al. | 363/59 |
| 5,051,881 | 9/1991 | Herold | 363/60 |
| 5,095,223 | 3/1992 | Thomas | 363/60 X |
| 5,111,375 | 5/1992 | Marshall | 363/60 |
| 5,132,895 | 7/1992 | Kase | 363/60 |
| 5,237,209 | 8/1993 | Brewer | 363/60 X |
| 5,245,524 | 9/1993 | Nakagawa et al. | 363/62 |
| 5,306,954 | 4/1994 | Chan et al. | 363/60 X |
| 5,438,504 | 8/1995 | Menegoli | 363/60 |
| 5,625,544 | 4/1997 | Kowshik et al. | 363/59 |
| 5,635,776 | 6/1997 | Imi | 363/60 X |

*Primary Examiner*—Peter S. Wong
*Assistant Examiner*—Y. J. Han
*Attorney, Agent, or Firm*—Charles L. Rubow

[57] ABSTRACT

A bi-directional DC/DC voltage converter having first and second input/output terminals for respectively receiving on a mutually exclusive basis uni-directional current at first and second voltages. A charge pump circuit connected between the first and second input/output terminal, depending on which voltage is supplied, converts that voltage to the other voltage.

6 Claims, 2 Drawing Sheets

BI-DIRECTIONAL DC/DC VOLTAGE CONVERTER

BACKGROUND OF THE INVENTION

This invention generally relates to DC/DC voltage conversion circuits, and more particularly to a bi-directional charge pump DC/DC voltage converter circuit well suited for fabrication as a solid state device.

A variety of charge pump type circuits are known and in common use in applications requiring that an available DC voltage be increased or multiplied to provide a higher DC voltage for low power applications, such as required for efficiently driving power field effect transistors (FET's) and power integrated circuits of metal oxide semiconductor construction. Present low cost power FET's, for example, require a gate control voltage of at least nine volts to achieve a low impedance "closed switch" state. However, other circuitry, such as the logic circuitry frequently employed to produce the control signals for the power control devices may require a supply voltage of approximately three volts. Thus, two distinct voltages may be required in a single power switching circuit.

A specific application in which the foregoing is true is an electronic thermostat for switching of power to an AC load such as the actuator solenoid of a fuel valve or the control winding of a cooling system relay. Electrical power at a desired DC voltage, if continuously available at the thermostat, could be converted to another required DC voltage through any of a variety of known voltage conversion approaches. However, for reasons set forth in an application for a patent entitled "Power Stealing Solid State Switch for Supplying Operating Power to an Electronic Control Device" Ser. No. 08/789,731 filed concurrently with the present application in the name of the same inventor, it is desirable to "steal" the necessary operating power for the control circuitry from the power which is being switched.

During the periods in which the switching device is in a high impedance "open switch" state, it is relatively easy to steal the required operating power, since there is ample voltage across the device. However, during periods in which the device is in a low impedance "closed switch" state, essentially no voltage is available across the device, and stealing operating power becomes much more difficult. The above-identified application discloses a method and circuitry for stealing power during both operating states of the device.

For a variety of reasons set forth in the above identified application, it is desirable to minimize the amount of stolen power. Further, during the times in which the AC load is being powered through the switching device, it is desirable to steal operating power for the device during short intervals as close in time to the zero crossings of the supplied current as possible. Thus, during those intervals only a small magnitude DC voltage is available, whereas when the AC load is not being powered, a higher DC voltage is available. Since DC voltages of both magnitudes are required for operating the control device, conversion of a small magnitude DC voltage to a larger magnitude DC voltage is required at some times, and conversion of a larger magnitude DC voltage to a smaller magnitude DC voltage is required at other times.

Charge pump technology involving switched capacitors is known and is used in a variety of applications for multiplying low power DC voltages. However, the requirement for "switching" in such circuits to functionally rearrange capacitors gives rise to an undesirable feature. Functional "switching" elements in a solid state integrated circuit are relatively large, and consume a disproportionate portion of chip area. Thus, it is desirable for any charge pump to be fabricated in an integrated circuit to utilize a circuit design which minimizes the number of switching elements.

The applicant has devised a charge pump method and apparatus for bi-directional DC/DC voltage conversion which avoids many of the disadvantages of prior techniques for accomplishing an analogous function. Voltage conversion according to the applicant's approach is readily accomplished with circuitry of simple and inexpensive design, which design requires a minimum number of switching elements, thereby facilitating its incorporation into a solid state integrated circuit.

SUMMARY OF THE INVENTION

The present invention is a method and apparatus for bi-directional conversion of a DC voltage between the first and second distinct voltage levels, depending on which voltage level is provided from a DC voltage source at any particular time, thereby providing continuous availability of DC voltages at both levels. An energy storage element at each of the first and second voltages is charged either from a source of that voltage or from the other energy storage element through a bi-directional DC/DC voltage conversion circuit. The voltage conversion circuit comprises a plurality of transfer energy storage elements and an array of switching elements controlled to periodically rearrange the transfer energy storage elements to multiply the DC voltage during time intervals that the circuit is being sourced from the smaller magnitude DC voltage source and to divide the DC voltage during intervals in which the circuit is being sourced from the larger magnitude DC voltage source.

The converter circuit may be formed in part of identical modules each comprising first and second transfer energy storage elements and a switching element, each module providing a predetermined voltage multiplication/division. The modules can be combined to provide any desired overall level of voltage multiplication/division.

DESCRIPTION OF THE PREFERRED EMBODIMENT

Figure 1:
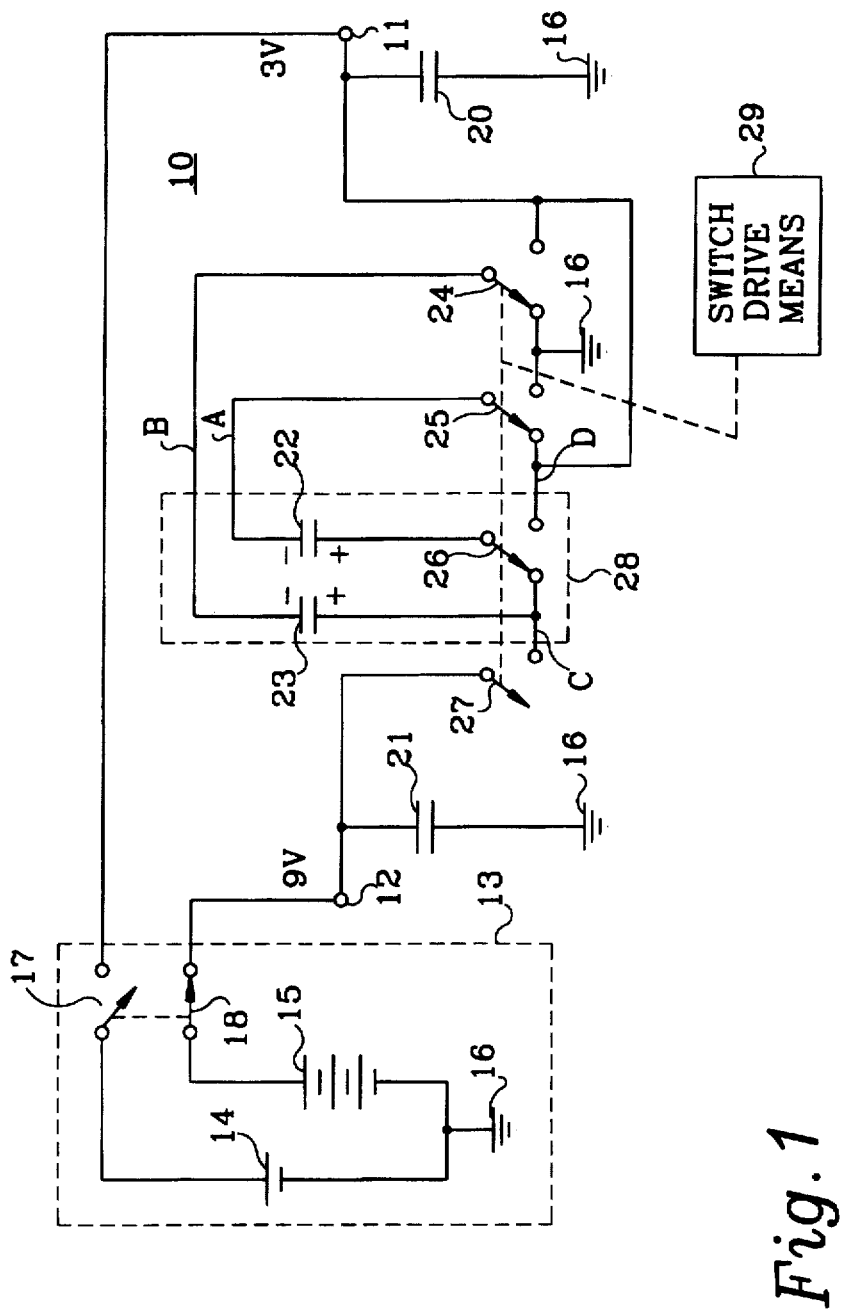
FIG. 1 is a schematic circuit diagram of a preferred embodiment of the applicant's voltage converter circuit configured to provide voltages differing by a factor of three.

In the schematic circuit diagram of FIG. 1, reference numeral 10 generally identifies a bi-directional DC/DC converter circuit in accordance with the applicant's invention configured to convert between DC voltages which are related by a factor of three. Circuit 10 is alternatively supplied a unidirectional current at three volts through an input/output terminal 11 or at nine volts through an input/output terminal 12. The input currents at three volts or nine volts are shown supplied by a source 13 which, in simplest terms, may be considered to comprise a three volt battery 14 and a nine volt battery 15 having their negative terminals connected to a source of reference potential or circuit ground 16. The positive terminals of batteries 14 and 15 are connected to circuit terminals 11 and 12 respectively through switches 17 and 18 which are interconnected so that the switches are maintained in opposite states. In actual application, source 13 may be considerably more complicated and provide a number of auxiliary functions, as, for example, shown in the above-identified patent application which discloses an electronic thermostat containing circuitry which requires operating voltages at both three volts and nine volts.

The above-identified electronic thermostat includes special provisions for start-up. Once start-up is completed, the portions of the thermostat analogous to source 13 provide three volts to terminal 11 when the thermostat is commanding power to a load attached thereto. During that time, no voltage is supplied by the source to terminal 12. Conversely, when the thermostat is not commanding power to the load, the portions of the thermostat corresponding to source 13 provide nine volts to terminal 12 and no voltage to terminal 11. During intervals when no voltage is being supplied by the source to terminal 12, circuit 10 converts the three volts available at terminal 11 to nine volts and supplies current at nine volts through terminal 12. Conversely, when the source is not supplying three volts to terminal 11, circuit 10 converts the nine volts available at terminal 12 to current at three volts which is supplied through terminal 11.

Short term energy storage is provided by capacitors 20 and 21 which are connected between terminal 11 and ground 16 and between terminal 12 and ground 16, respectively, whereby after start-up, capacitors 20 and 21 are charged to three volts and nine volts, respectively. Charge is transferred between capacitors 20 and 21 by means of charge transfer capacitors 22 and 23 and an array of switching elements 24, 25, 26 and 27 which are interconnected to operate in unison under the control of a drive circuit (29). Switches 24–27 are shown as electromechanical devices having movable circuit closure members only for illustrative purposes. In preferred solid state integrated circuit form, the switching function is accomplished in a known manner by solid state devices. In operation, switches 24–27 are cycled at a high rate of 1kHz or more.

As shown, capacitor 22 is connected between the poles of switches 25 and 26. Switch 25 alternately connects a first plate of capacitor 22 to terminal 11 or to ground 16.

Switch 26 alternately connects the second plate of capacitor 22 to a first plate of capacitor 23 or to terminal 11. Switch 24 alternately connects the second plate of capacitor 23 to ground or to terminal 11. Switch 27 alternately connects terminal 12 to and disconnects terminal 12 from the first plate of capacitor 23.

In operation, if source 13 is supplying voltage to terminal 11, during the portion of the switch drive cycle illustrated in FIG. 1, and assuming operation after start up is completed, capacitor 22 is charged to three volts with the polarity as indicated on the drawing. This voltage is added to the three volt charge on capacitor 20 to charge capacitor 23 to six volts. This operation transfers one unit of charge from the three volt input. No charge is transferred to capacitor 21 since switch 27 is open.

During the alternate half of the switch drive cycle, the three volt supply charges capacitor 22 to three volts, providing two units of charge from the three volt input. Capacitor 23, which was previously charged to six volts, is connected in series with the three volt source to provide nine volts to capacitor 21 corresponding to transfer of one unit of charge to the nine volt output. During one complete switch drive cycle, three units of charge are transferred into the three volt input and one unit of charge is transferred out of the nine volt output. Thus, converter circuit 10 functions as a "DC transformer" in a voltage multiplier mode.

Conversely, when source 13 is supplying nine volts to terminal 12, circuit 10 functions as a voltage divider. More specifically, during the portion of the switch drive cycle represented in FIG. 1, the three volt charge on capacitor 22 is effectively subtracted from the six volt charge on capacitor 23 to maintain the three volt charge on capacitor 20. This corresponds to the transfer of unit of charge to the three volt output. Since switch 27 is open, no charge is transferred from capacitor 21.

For the alternate half of the drive switch cycle, the six volt charge on capacitor 23 is subtracted from the nine volt charge on capacitor 21 to maintain the charge on capacitor 20 at three volts. Concurrently, capacitor 22 is connected in parallel with capacitor 20 to assist in maintaining three volts on capacitor 20. The foregoing operation corresponds to transfer of one unit of charge from the nine volt input and two units of charge to the three volt output. During one complete switch drive cycle, one unit of charge is transferred through the nine volt input and three units of charge are charge is transferred through the three volt output.

Figure 2:
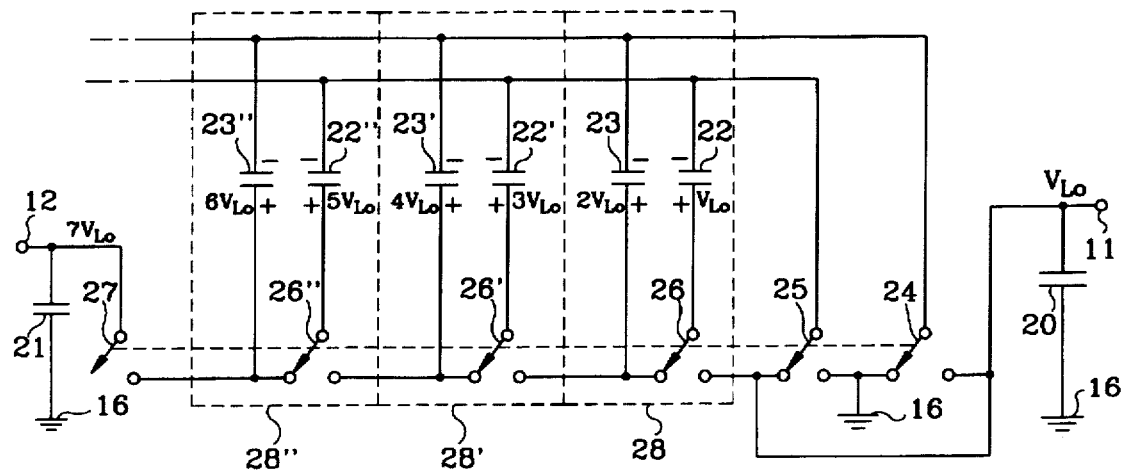
FIG. 2 is a schematic circuit diagram of the applicant's converter circuit illustrating how multiplier/divider modules can be added to provide any desired level of voltage multiplication/division.

Reference numeral 28 in FIG. 1 identifies a converter module comprising two capacitors and a switch which may be replicated as shown in FIG. 2 to achieve voltage conversion by factors other than three. For convenience of description, the converter module may be considered as having first, second, third and fourth interconnection paths designated by reference characters A, B, C and D. Three such converter modules identified by reference numerals 28, 28' and 28" are shown in the circuit of FIG. 2 in which components of the input/output ends of the circuit which are common to FIGS. 1 and 2 are identified by the same reference numerals in both Figures. The embodiment shown in FIG. 2 provides voltage conversion by a factor of seven, each additional module (28' and 28") adding a multiplication/division factor of two.

In operation, first consider the situation in which a low voltage is being converted to a higher voltage. During the half of the switch drive cycle opposite that shown in FIG. 2, the voltage VLD available on terminal 11 is impressed through switch 26 onto one plate of capacitor 22, the other plate of which is connected to ground 16 through switch 25. The voltage across capacitor 23, which was previously charged to two $V_{Lo}$, is added to the voltage available on terminal 11 by connection of the negativity charged plate of capacitor 23 to terminal 11 through switch 24. The other plate of capacitor 23 is connected to one plate of capacitor 22' through switch 26. Similarly, capacitors 22' and 23' were previously charged to three $V_{Lo}$ and four $V_{Lo}$, respectively, and capacitors 22" and 23" were previously charged to five $V_{Lo}$ and six $V_{Lo}$, respectively. The voltage $V_{Lo}$ available at terminal 11 is conducted through switch 24 to one plate of capacitor 23" where it is added to the six $V_{Lo}$ voltage thereon and supplied as seven $V_{Lo}$ of terminal 12 resulting in a voltage across capacitor 21 to seven $V_{Lo}$.

During the alternate half of the switch drive cycle (switches in the states shown in FIG. 2) the voltage $V_{Lo}$ at terminal 11 is conducted through switch 25 to one plate of capacitor 22 which was previously charged to $V_{Lo}$. The other plate of capacitor 22 is connected through switch 26 to one plate of capacitor 23, the other plate of which is connected to ground. Thus, the sum of two $V_{Lo}$ from terminal 11 and capacitor 22 appears across capacitor 23. Similarly, it can be seen that the voltage $V_{Lo}$ at terminal 11 when added to the voltages three $V_{Lo}$ and five $V_{Lo}$ across capacitors 22' and 22 respectively balance the voltages of four $V_{Lo}$ and six $V_{Lo}$ across capacitors 23 and 23". Thus, capacitors 22, 23, 22', 23', 22" and 23" are charged as required for the next half switch drive cycle in which the sum of the voltages voltage at terminal 11 and across capacitor 23" is supplied to terminal 12 and capacitor 21.

Figure 3:
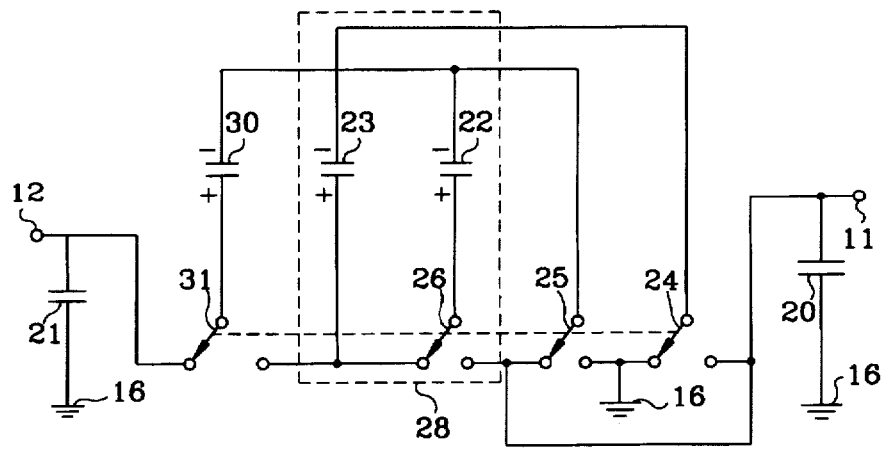
FIG. 3 is a schematic circuit diagram of an alternative version of the applicant's converter circuit for providing two voltages which differ by a factor of four.

FIG. 3 shows an embodiment of the applicant's voltage converter which converts voltage by a factor of four and in which the charge transferred at the higher voltage is approximately ¼ of the charge transferred at the lower voltage. The elements of the circuit of FIG. 3 which are in common with those in FIG. 1 are identified by the same reference numerals in both Figures. The circuit of FIG. 3 includes an additional capacitor 30 which, in operation, is charged to three times the voltage at input/output terminal 11. Switch 27 of the circuit of FIG. 1 is replaced with switch 31 which during one half of the switch drive cycle connects one plate of capacitor 30 to one plate of capacitor 23 whereby capacitor 30 receives the charge. During the other half of the switch drive cycle the voltage on capacitor 30 is added to the input voltage, and the sum of four times the input voltage is supplied across capacitor 21 and to input/output terminal 12.

Although particular embodiments of the applicant's bi-directional DC/DC voltage converter are shown and described for illustrative purposes, variations thereof will be apparent to those of ordinary skill in the relevant arts. It is not intended that the scope of coverage be limited to the illustrated embodiments, but only by the terms of the following claims.

The embodiments of the invention in which an exclusive property or right is claimed are defined as follows:

1. A bi-directional DC/DC voltage converter circuit comprising:

a reference potential source at a reference electric potential;

first and second input/output terminals for respectively receiving uni-directional electric currents at first and second distinct electric potentials relative to the reference electric potential;

first and second capacitors respectively connected between said first and second input/output terminals and said reference potential source;

third and fourth capacitors each having first and second plates;

a first switching element operable in first and second states to connect the first plate of said third capacitor to said reference potential source and to said first input/output terminal, respectively;

a second switching element operable in first and second states to connect the first plate of said fourth capacitor to said first input/output terminal or to said reference potential source, respectively;

a third switching element operable in first and second states to connect the second plate of said third capacitor to said first input/output terminal and to the second plate of said fourth capacitor, respectively; and a fourth switching element operable in first and second states, in its first state connecting the second plate of said fourth capacitor to said second input/output terminal, said first, second, third and fourth switching elements being concurrently operable to their first or second states.

2. A bi-directional DC/DC voltage converter circuit comprising:

a reference potential source at a reference electric potential;

first and second input/output terminals for respectively receiving uni-directional electric currents at first and second distinct electric potentials relative to the reference electric potential;

first and second storage capacitors respectively connected between said first and second input/output terminals and the reference potential source;

at least a first voltage converter module including first and second charge transfer capacitors each having first and second plates, a first switching element and first, second, third and fourth interconnection paths, the first plates of said first and second charge transfer capacitors being connected to the first and second interconnection paths respectively, the second plate of said second charge transfer capacitor being connected to the third interconnection path and the second plate of said first charge transfer capacitor being connected through said first switching element in its first and second states to the second plate of said second capacitor and to the fourth interconnection path, respectively;

a second switching element operable in first and second states to connect the second interconnection path of said first voltage converter module to said reference potential source and to said first input/output terminal, respectively;

a third switching element operable in first and second states to connect the first interconnection path of said first voltage converter module to said first input/output terminal and to said reference potential source, respectively; and connecting means including a fourth switching element having first and second states and operable in its second state to connect the fourth interconnection path of said first voltage converter module to said second input/output terminal, said first, second, third and fourth switching elements being operable in unison to their first or second states.

3. The bi-directional DC/DC voltage converter circuit of claim 2 wherein said connecting means comprises a second voltage converter module identical to said first voltage converter module, the first and second interconnection paths of said second voltage converter module being respectively connected to the first and second interconnection paths of said first voltage converter module, and the fourth interconnection path of said second voltage converter module being connected to the third interconnection path of said first voltage converter module.

4. Apparatus for converting electric current from a source which supplies the current at either of first and second peak voltages, the second peak voltage being greater than the first peak voltage, into a first DC voltage having a magnitude less than the first peak voltage and a second DC voltage having a magnitude between the first and second peak voltages, the apparatus comprising:

a reference potential source;

a first capacitor;

a first current path for connecting said first capacitor between said reference potential source and the current source at the first peak voltage;

a second capacitor;

a second current path for connecting said second capacitor between said reference potential source and the current source at the second peak voltage;

third and fourth capacitors;

two-state switch means interconnecting said first, second, third and fourth capacitors so that in the first state of said two-state switch means said first and third capacitors are connected in series across said fourth capacitor, and that in the second state of said two-state switch means, said first and fourth capacitors are connected in series across said second capacitor, and said third capacitor is connected in parallel with said first capacitor; and means for periodically changing states of said two-state switch means, whereby (1) when said first capacitor receives current from the current source and said two-state switch means is in its first state, said fourth capacitor is charged to a voltage equal to the sum of the voltages on said first and third capacitors, (2) when said first capacitor is receives current from the current source and said two state switch means is in its second state, said second capacitor is charged to a voltage equal to the sum of the voltages on said first and fourth capacitors, and said third capacitor is charged to a voltage equal to the voltage on said first capacitor (3) when said second capacitor receives current from the current source and said two-state switch means is in its first state, said first capacitor is charged to a voltage equal to the difference in voltages on said third and fourth capacitors, and (4) when said second capacitor receives current from the current source and said two-state switch means is in its second state, said first capacitor is simultaneously charged by the series combination of said second and fourth capacitors and by said third capacitor to a voltage equal to the difference in voltages on said second and fourth capacitors.

5. Apparatus for simultaneously supplying two distinct DC voltages, comprising:

a current source having first and second supply terminals and first and second alternative operating modes, said current source in its first operating mode being operable to produce from its first supply terminal uni-directional electric current at a first voltage, and in its second operating mode being operable to produce from its second supply terminal uni-directional electric current at a second voltage distinct from the first voltage; and a bi-directional DC/DC voltage converter circuit having first and second input/output terminals respectively connected to the first and second supply terminals of said current source, said bi-directional DC/DC voltage converter circuit being responsive to uni-directional current at the first voltage supplied to its first input/output terminal to produce uni-directional current at substantially the second voltage from its second input/output terminal, said bi-directional DC/DC voltage converter circuit also being responsive to uni-directional current at the second voltage supplied to its second input/output terminal to produce uni-directional current at substantially the first voltage from its first input/output terminal.

6. The apparatus of claim 5 wherein said bi-directional DC/DC voltage converter circuit comprises:

a reference potential source at a reference electric potential;

first and second storage capacitors respectively connected between said first and second input/output terminals and the reference potential source;

a voltage converter module including first and second charge transfer capacitors each having first and second plates, a first switching element operable in first and second states, and first, second, third and fourth interconnection paths, the fourth interconnection path being connected to the first input/output terminal, the first plates of the first and second charge transfer capacitors being connected to the first and second interconnection paths respectively, the second plate of said second charge transfer capacitor being connected to the third interconnection path, and the second plate of said first charge transfer capacitor being connected through said first switching element in its first and second states to the second plate of said second charge transfer capacitor and to the fourth interconnection path, respectively;

a second switching element operable in first and second states to connect the first interconnection path of said voltage converter module to the first input/output terminal and to said reference potential source, respectively;

a third switching element operable in first and second states to connect the second interconnection path of said voltage converter module to said reference potential source and to the first input/output terminal, respectively; and connecting means including a fourth switching element having first and second states and operable in its second state to connect the third interconnection path of said voltage converter module to the second input/output terminal, said first, second, third and fourth switching elements being operable in unison to their first or second states.

* * * * *

UNITED STATES PATENT AND TRADEMARK OFFICE
CERTIFICATE OF CORRECTION

PATENT NO. : 5,768,116
DATED : June 16, 1998
INVENTOR(S) : Arlon D. Kompelien

It is certified that error appears in the above-identified patent and that said Letters Patent is hereby corrected as shown below:

Claim 2, Column 6, line 21, after "second" (second occurrence), insert - -charge transfer- - .

Claim 2, Column 6, line 35, delete "fourth" and insert - -third- - .

Signed and Sealed this

Seventh Day of December, 1999

Attest:

Q. TODD DICKINSON

*Attesting Officer*    *Acting Commissioner of Patents and Trademarks*